Patented Nov. 26, 1929

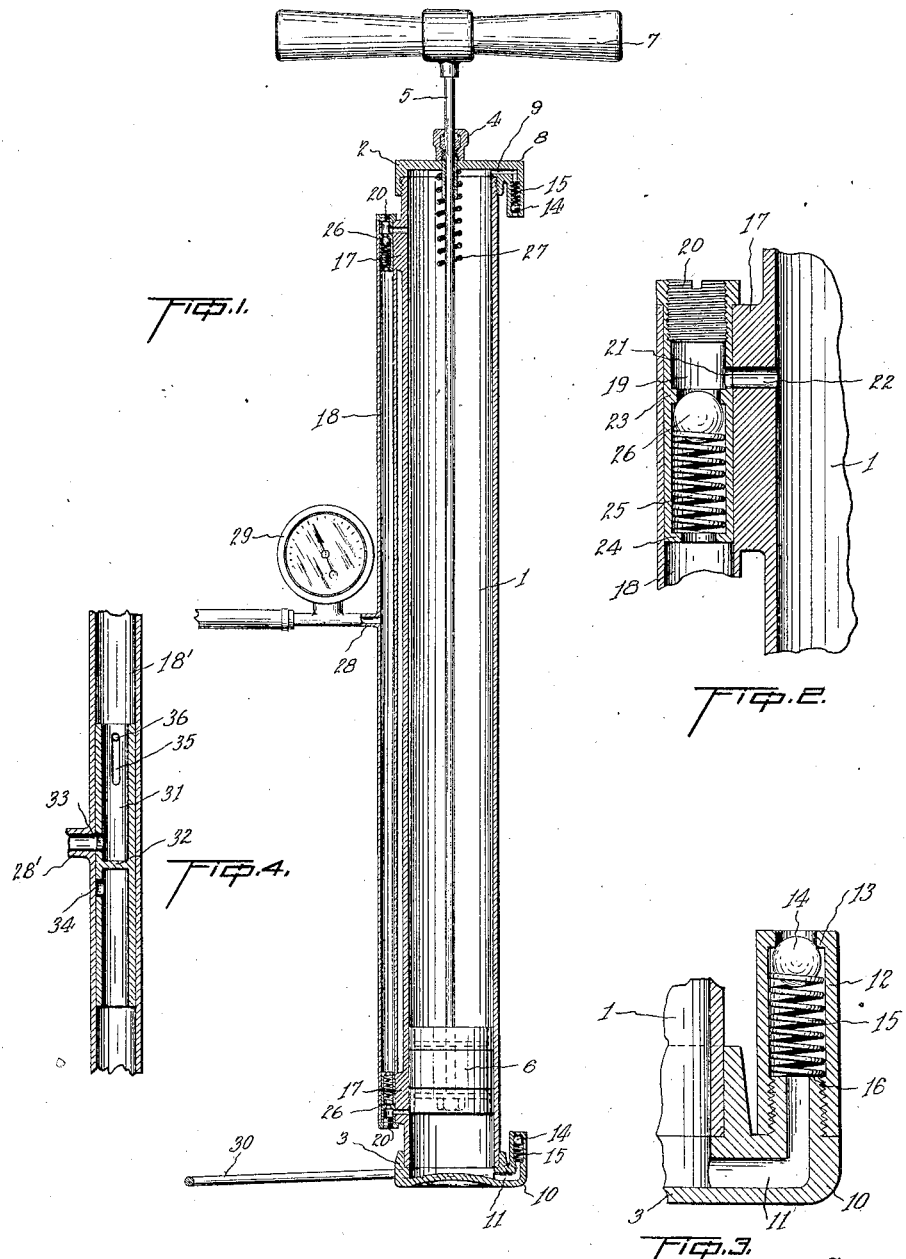

1,737,536

UNITED STATES PATENT OFFICE

HOMER HASTING, OF DETROIT, MICHIGAN

TIRE-PUMP VALVE

Application filed January 16, 1928. Serial No. 247,011.

The present invention pertains to a novel pump constructed particularly to force air into automobile or bicycle tires.

The principal object of the invention is to provide a pump of this character operating on the double acting principle and having spring-backed check valves controlling its several ports. In this connection it may be said that each such check valve, or at least certain of them, is confined in a separate casing which may be applied to the port. The casing is formed internally with a valve seat and an open spring seat, the former being controlled by a ball valve backed by a spring which abuts the spring seat. The invention further contemplates the use of a slide valve controlling the flow from the discharge ports of the device.

The invention is fully disclosed by way of example in the following description and in the accompanying drawing, in which—

Figure 1 is a longitudinal section of the device;

Figures 2 and 3 are detail sections on a larger scale; and

Figure 4 is a detail section of a modification.

Reference to these views will now be made by use of like characters which are employed to designate corresponding parts throughout.

The device comprises a barrel 1 having heads 2 and 3 fitted over the upper and lower ends thereof respectively. The upper head is provided with a gland 4 through which is slidably passed a piston rod 5 extending well into the cylinder and provided at its innermost end with a piston 6. The upper or exterior end of the rod carries an operating handle 7.

The upper head 2 is formed with a lug 8 having a passage 9 communicating with the interior of the cylinder 1. In like manner, the lower head 3 has an extension 10 formed with a passage 11 also communicating with the cylinder. These passages are fitted with separate valve containers of like construction, and it will therefore be necessary to describe only one of these. Considering Figure 3, it will be seen that a valve casing 12 is threaded on the extension 10 in a manner to communicate with the passage 11. The outermost end of the casing is formed with an internal flange 13 which constitutes a valve seat for the ball valve 14 within the casing. The casing further contains a spring 15 having one end engaging the ball valve and the other end resting on the end 16 of the extension 10 which constitutes in this case a spring seat. These are the air intake valves to the cylinder and act in opposite directions as will presently appear.

The barrel is formed at its ends with enlarged or thickened portions 17 joined by a pipe 19 suitably secured thereto or formed therewith.

The ends of the pipe 18 are fitted each with a valve casing 19 having its upper end closed by a plug 20. The casing wall has a port 21 communicating with a duct 22 extending through the enlargement 17 to connect with the interior of the barrel. Inwardly of the port, the casing 19 is formed with an internal rib 23 constituting a ball seat, and the remaining extremity of the casing has an inner flange 24 which forms a spring seat. On the latter is mounted a spring 25 supporting in turn a ball valve 26 adapted to control the flow through the seat 23.

When the piston 6 is drawn upwardly, the lower intake valve opens and the lower discharge valve closes. Conversely, the upper intake valve closes and the upper exhaust valve opens, so that air is forced by the pump out of the upper end of the cylinder and into the pipe 18. It will be apparent that the reverse conditions prevail on the downward stroke of the piston, so that air is forced into the pipe 18 from the lower end of the cylinder. The result of this double acting operation is that the pipe 18 receives air from the pump in substantially a continuous manner regardless of the direction of the piston.

From the upper head 2 is suspended a spring 27 surrounding the stem 5. The spring is engaged and compressed by the piston on the upward stroke of the latter and thus restrains the piston from striking the upper head. A line 28 extends from the center of the pipe 18 and is adapted for connection to a tire pump. This line is provided with a gauge 29 which indicates the pressure attained in the tire. To the lower head 3 is fitted a foot piece 30 by means of which the device is supported on the ground in vertical position.

Figure 4 illustrates a modified form of valve replacing the exhaust valves provided in the casings 19. This device consists of a sleeve 31 slidable at the intersection of the pipe 18' and line 28'. The sleeve has a central partition 32 and is formed at opposite sides thereof with ports 33 and 34 adapted to register separately with the line 28'. The sleeve is also formed with a longitudinal slot 35 receiving a pin 36 extending from the pipe 18'. The nature of this slot and pin connection is such that the sleeve will be stopped when either of its ports is brought into register with the line 28'. On the upward stroke of the piston the sleeve will be moved to the position shown in the figure, and on the downward stroke it will be moved upwardly until the port 34 communicates with the line 28'.

Although specific embodiments of the invention have been described and illustrated, it will be understood that various alterations in the details of construction may be made without departing from the scope of the invention as indicated by the appended claims.

What I claim is:—

1. The combination with a tube having a lateral outlet of a tubular valve mounted in said tube and adapted for longitudinal movement therein, said tubular valve having a centrally disposed partition formed therein and adapted to prevent flow of fluid through said tube, lateral ports formed in said tubular valve on opposite sides of said partition and adapted for registration with said lateral outlet, and means for limiting longitudinal movement and for preventing rotation of said tubular valve whereby fluid under pressure on either side of said tubular valve causes the port on the same side of said partition to register with said lateral outlet in said tube to direct the fluid out said lateral outlet.

2. The combination with a tube having a lateral outlet of a partitioned sleeve slidably mounted in said tube, a longitudinally disposed slot formed in said sleeve, a pin mounted in said tube and adapted to extend into said slot to limit the longitudinal movement of said sleeve and prevent rotation thereof, and lateral ports formed in said sleeve on opposite sides of said partition, said slot and pin and said last named ports being so disposed in relation to each other that fluid under pressure on either side of said tubular valve causes the port on the same side of said partition to register with said lateral outlet in said tube to direct the fluid out said lateral outlet.

In testimony whereof I affix my signature.

HOMER HASTING.